Sept. 4, 1962     S. H. QUANBECK     3,052,308
YIELDABLE DRAFT ATTACHMENT FOR AGRICULTURAL IMPLEMENTS
Filed Dec. 7, 1959     3 Sheets-Sheet 3
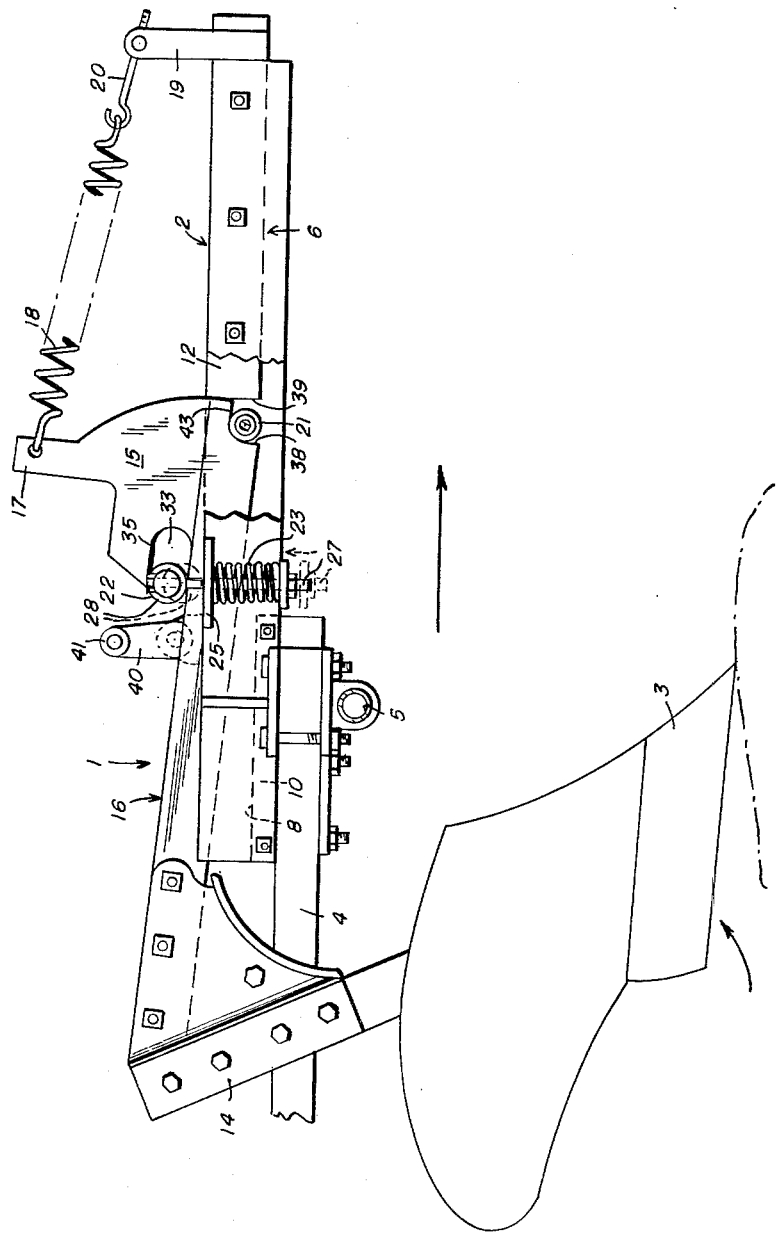
INVENTOR
SHERMAN H. QUANBECK
BY *Wilmer Mechlin*
*his* ATTORNEY 3,052,308
                    YIELDABLE DRAFT ATTACHMENT FOR
                          AGRICULTURAL IMPLEMENTS
                         Sherman H. Quanbeck, Aneta, N. Dak.
                         Filed Dec. 7, 1959, Ser. No. 857,876
                                13 Claims. (Cl. 172—264)

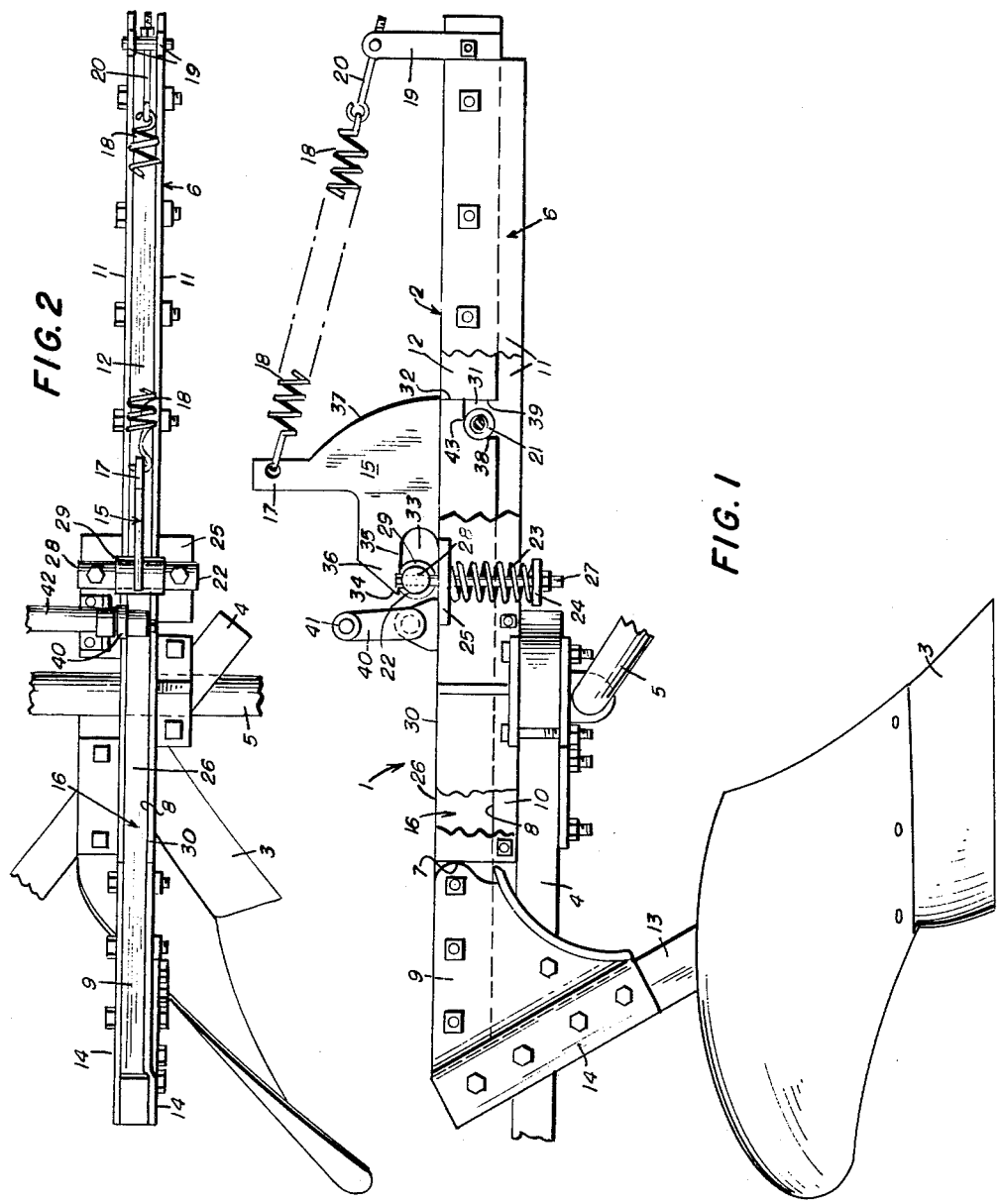

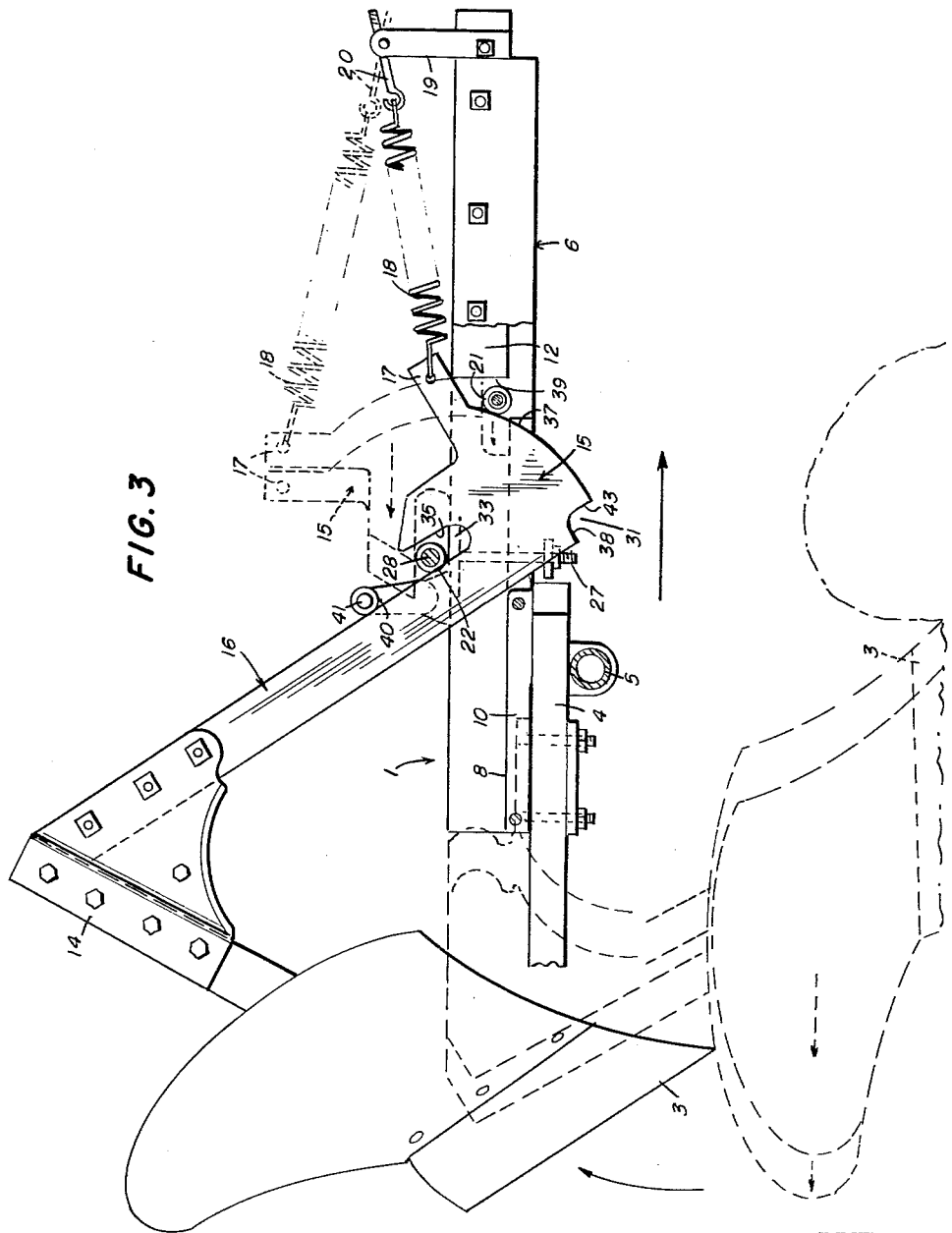

This invention relates to draft attachments for agricultural implements and has for its primary object the provision of an improved draft attachment whereby a plow or like implement, on hitting an obstruction, is enabled to yield vertically or both vertically and horizontally depending on the nature of the obstruction.

The shape of the conventional moldboard plow is such that, if on hitting a rock or other obstruction too large to be moved, the plow itself cannot move out of the way, the plow share will hook the obstruction with consequent bending or breaking of the plow share, the beam or the hitch. The smaller, lighter plows often can bounce to the side or over obstructions, although it usually is only a question of time before they meet an obstruction they cannot avoid. The problem is aggravated by the power and speed of modern tractors and is particularly acute for the larger, heavier, multi-bottom gang plows which are too heavy to move out of the way themselves and will hook any obstruction they cannot displace. A number of solutions have been proposed for the problem, some involving the hitch between the tractor and the plow frame and others the connection between an individual plow and the frame. However, because of risk of breakage, inconvenience in resetting or other reason, none of the proposed solutions have been very satisfactory.

It therefore is an object of the present invention to provide an improved jointed beam for a plow or like implement whereby an individual plow will yield without damage to itself, to the plow beam or frame or to the hitch to the tractor.

Another object of the invention is to provide a jointed beam for plows and the like, the plow-connected part of which is yieldable relative to the main part when the plow hits an obstruction and is returnable to normal position without requiring the tractor operator to get off the tractor.

An additional object of the invention is to provide a jointed beam for plows and the like whereby a plow is assisted in swinging clear of an obstruction it cannot bypass by spring means which normally restrain the plow against such swinging.

A further object of the invention is to provide a jointed beam for plows and the like which enables a plow to yield vertically or both vertically and horizontally, depending on the nature of the obstruction, and in the former case automaticaly restores the plow to normal position after the latter has passed the obstruction.

Other objects and advantages of the invention will appear hereinafter in the detailed description, be particularly pointed out in the appended claims and be illustrated in the accompanying drawings, in which:

FIGURE 1 is a fragmentary side elevational view of a gang plow incorporating a preferred embodiment of the draft attachment of the present invention;

FIGURE 2 is a plan view of the structure of FIGURE 1;

FIGURE 3 is a side elevational view of the structure of FIGURE 1 after the plow has hit and yielded horizontally and vertically to clear a major obstruction; and FIGURE 4 is a side elevational view of the structure of FIGURE 1 after the plow has yielded vertically to ride over a minor obstruction.

Referring now in detail to the drawings, in which like reference characters indicate like parts, the improved draft attachment, while useful, generally, with tractor-drawn, soil-tilling implements, is particularly designed for use with a tractor-drawn moldboard plow and has been so illustrated as exemplary of the invention.

Designated as 1, the improved draft attachment is comprised of a plural part, jointed beam 2 which may be the only beam of the plow or other implement. However, more usually, the beam 2 will be part of a gang frame (not shown) formed of a plurality of such beams arranged in parallel and each carrying one of a plurality of plow shares 3 in echelon or other suitable arrangement, the beams being connected by suitable cross-braces, one of which is indicated at 4. Carrying or supporting at the rear its moldboard plow share 3, the or each beam 2 may and, if part of a gang frame, will ordinarily be supported in front of the plow share on wheels (not shown) mounted on an off-set axle 5 rotatable to adjust the height of the plow share relative to ground level.

The jointed beam 2 includes a main or primary beam, part or portion 6 slotted or bifurcated from a point intermediate its ends to its rear end 7 to provide a slot 8 into which projects and is received or seated a trip, auxiliary, secondary or supplementary beam, part or portion 9. Extending over its front portion vertically through the main beam 6 and interrupted or bounded at the bottom therebehind by a cross-bearer or support plate 10 on which the trip beam 9 is normally supported, the slot 8 conveniently is provided by forming the main beam of a pair of side plates or rails 11, bolted or otherwise secured to each other and spaced laterally or transversely, forwardly of the slot, by a spacer bar 12 and over the rear portion by the cross-bearer 10.

Normally seated in the slot 8 parallel to or in longitudinal alignment with the main beam 6, the trip beam 9 has its rear portion, rearward of the main beam, fixed or secured to or made rigid with the shank or shaft 13 of the plow share 3, as by bolting through gusset plates 14. Fixed to or rigid and preferably integral with and forming the front portion of the trip beam 9 is a positioning, connecting holding or control plate, flange, arm or member 15, which is upright or vertically disposed and normally projects or extends above both beams normal or at right angles to the normally horizontally disposed body or leg 16 of the trip beam.

The positioning plate 15 preferably terminates upwardly in a lug or finger 17 to which, as by aperturing, is attached or connected the rear end of an expanded coil or other suitable tension spring 18. The front end of the spring 18 is anchored, desirably at a level below the rear end, to the main beam 6 forwardly of the slot 8, so that the spring normally is oblique to the main beam and slopes or is inclined downwardly and forwardly theretoward from the lug 17 on the positioning plate 15. Here, the spring 18 is anchored to the main beam 6 through a bracket 19 fixed or secured to and upstanding from the main beam adjacent the latter's front end and mounting for vertical swiveling or pivoting an eye bolt 20 attached directly to the spring and axially or longitudinally adjustable relative to the bracket to vary the spring's tension.

The trip beam 9 is designed to have two pivots or fulcrums, one fixed and the other, spaced rearwardly of the first, shiftable or movable upwardly or vertically against yieldable resistance. Both pivots are mounted on or carried by the main beam and are horizontal and disposed normal to and transversely or laterally of the main beam. Of the two pivots, each of which preferably is a roller, the fixed front pivot 21 here is in and extends across the front portion of the slot 8 in the main beam between the side plates 11. The movable rear pivot 22 extends across the main beam and here straddles and surmounts the side plates 11 above the slot 8.

To enable the rear pivot 22 to move as intended, there are provided in the illustrated embodiment a pair of coil or other suitable springs 23 at opposite sides of the main beam 6 and acting vertically yieldably to restrain or resist vertical movement of the pivot.

The illustrated springs 23 act in compression between horizontal spring plates, one a bottom or lower spring plate 24 extending across and normally spaced below the main beam 6 and the other a pair of aligned top or upper spring plates 25, serving as individual reactances for one of the springs and fixed to or rigid with and outstanding from opposite sides of the upper portion of the main beam. The force of the springs 23 is made adjustable and transmitted through the rear pivot 22 to the top or upper edge or surface 26 of the trip beam 9, normally to hold the latter against vertical movement relative to the main beam 6, by a pair of bolts 27 each encircled by one of the springs and extending vertically through the lower spring plate 24, one of the upper spring plates 25 and the adjoining end of the axle 28 of the pivot outwardly of its rollable sleeve or intermediate portion 29. Thus, if, as in the illustrated embodiment, the upper surfaces 26 and 30 of the trip beam 9 and main beam 6, respectively, are substantially flush or level when the trip beam is fully seated in the slot 8, the rear pivot 22 will normally ride or rest on both surfaces.

Each of the front and rear pivots 21 and 22 is engaged by and seats or fits in the positioning plate 15, the front pivot normally in a forwardly opening slot or recess 31 in the front end 32 of the plate and the rear pivot permanently in a rearwardly opening slot or recess 33 in the rear end 34 of the plate. Of the two slots the rearwardly opening rear slot 33 is of substantially the width of the rear pivot 22 and extends and is elongated or of a depth, longitudinally or parallel to the longitudinal or sliding axis of the trip beam 9, to contain the rear pivot while accommodating or permitting rearward movement of the trip beam relative to the main beam 6 at least to the point at which the front pivot 21 is disengaged or displaced from or free of the front slot 31. Parallel-sided and spaced vertically from the front slot 31 in correspondance with the vertical spacing of the pivots 21 and 22, the rear slot 33 here is bounded at the bottom by a forward extension or front part of the normally substantially horizontal upper surface 26 of the trip beam 9 and at the top by the undersurface 35 of an overhanging, rearwardly projecting lip 36 of the positioning plate 15. The front slot 31 for the front pivot 21 may also be bounded at both top and bottom, but to serve its intended purpose, need only be bounded at the top and conveniently may be a forwardly and downwardly opening, substantially rectangular notch cut into the lower front corner of the positioning plate. Between the front slot 31 and the spring-attaching finger 17, the front end 32 of the positioning plate 15 is arcuately convex and preferably in the form of a cylindrical segment 37 which, when the front pivot 21 is disengaged or displaced from the front slot, is concentric or coaxial with the rear pivot 22.

Connected in the above manner to the main beam 6, the trip beam 9 in normal or plowing position will be supported in the slot 8 on the cross-bearer 10 and the front pivot 21 and will be held parallel to or in longitudinal alignment with and against vertical movement or displacement relative to the main beam by the downward force of the springs 23 applied to the top 26 of the trip beam through the rear pivot or roller 22. Limited or stopped in forward movement relative to the main beam either by engagement of the front roller 21 with the rear wall 38 of the front slot 31 or, to relieve the front roller of constant stress, by engagement of the front end 32 of the positioning plate 15 with a fixed stop or abutment 39 on the main beam, here the rear end of the spacer bar 12 demarking or bounding the front end of the slot 8, the trip beam 9, in its normal position, is held as well against rearward movement or displacement relative to the main beam by the forward pull exerted by the tension spring 18 on the finger 17 of the positioning plate 15.

The forces exerted by the springs 23 and 18 being sufficient to resist or restrain relative movement of the trip and main beams except when the plowshare 3 hits an obstacle that is difficult or impossible to displace, the trip and main beams, except under such circumstances, act as though they were a unitary beam. However, unlike a unitary beam, when the plowshare does hit or strike such an obstacle, the jointed beam 1 of this invention can give or yeld in whichever of two ways is appropriate to the obstacle.

If, as in FIGURE 3, the obstacle is of such size and at such a level as to block completely the path of the plowshare, the resultant rearward force on the forwardly moving plow will pull or displace the trip beam 9 rearwardly relative to the main beam against the resistance or restraint of the spring 18 until the front roller 21 is displaced or disengaged from the front slot 31 in the positioning plate 15. Thereupon, the trip beam will swing or pivot clear of the obstacle about the rear pivot 22 with the front pivot, the while, either spaced from or rolling upwardly along the segmental cylindrical surface 37 on the front end 30 of the positioning plate 15. Continuing, if necessary to avoid the obstacle, to the point at which the front pivot 21 engages the upstanding finger 17 on the positioning plate 15, the upward swinging of the trip beam 9, while powered mainly by the pull of the associated tractor on the plow, also is aided to ensure clearance of the obstacle by the downward component of the force of the preferred spring 18 exerted, by virtue of its inclination, through the positioning plate 15, the latter acting as a lever arm.

Once the plow has passed the obstacle, the weight of the plowshare 3 will tend to return the trip beam 9 to normal position, but cannot do so unassisted because of the increasing resistance imposed by the spring 18 as the trip beam approaches normal position, even though the trip beam is then turning about the rear roller 22 and through its segmental surface 37 on the front roller 21, with consequent minimizing of the frictional resistance to its return. However, the problem is readily solved without requiring the operator to dismount from the tractor. The solution employed will depend on the relation between the opposing forces of gravity and the spring 18 on the trip beam. If this relation is such that the plowshare of its own weight will return to the ground, the operator need simply back the plow to obtain, by biting of the plowshare into the ground, the additional force required to swing the trip beam to horizontal position and reengage the front pivot 21 with its slot 31. Alternatively, the necessary additional force may be supplied by mechanical means adapted to act downwardly on the trip beam 9 rearwardly of the rear pivot 22. In the illustrated embodiment, such mechanical means are provided in the form of a reset or crank arm 40 mounted on the main beam 6 for pivoting or swinging vertically about an axis transverse to the beam and either itself or, as here, through a roller, carrying a crank pin 41, overlying and engageable with a portion of the trip beam rearwardly of the rear pivot. Normally in upright position so as not to interfere with vertical swinging of the trip beam when the plowshare 3 hits an obstacle, the reset arm 40 is readily swingable into engagement with the trip beam, to reset or return the latter to normal position, by drivably connecting its crank shaft 42 to the conventional plow lift mechanism (not shown) of the tractor.

The other possible reaction of the jointed beam 1 to the plow hitting an obstacle is illustrated in FIGURE 4. As indicated in this figure, the obstacle, while initially blocking the path of the plowshare is of such size and disposition that the plowshare can pass over it, if capable of limited vertical movement, rather than the extended vertical movement obtainable on disengagement of the front pivot 21 from its slot 31. This capability, with automatic resetting, is possessed by the jointed beam of this invention because of the limited upward or vertical yieldability of the rear pivot 22 and the ability of the trip beam concurrently to pivot about the front pivot 21 to the limit imposed by the rear pivot, the front pivot 21 then riding against the top or downwardly facing wall 43 of the front slot 31, and the segmental surface 37 sliding on the abutment 39 limiting forward movement of the trip beam 9. Since on swinging or moving vertically against the resistance of the springs 23, the trip beam 9 maintains its normal engagement with the front and rear pivots 21 and 22, once the plowshare 3 has cleared the obstruction responsible for the movement, the trip beam will automatically return to its normal position in its slot or seat 8 in the main beam 6.

From the above detailed description, it will be apparent that there has been provided an improved jointed beam for plows and like agricultural implements which, when the plow hits an obstacle, can yield either vertically or horizontally and vertically to avoid the obstacle and in neither case requires manual handling to restore it to normal position. It should be understood that the described and disclosed embodiment is merely exemplary of the invention and that all modifications are intended to be included which do not depart from either the spirit of the invention or the scope of the appended claims.

Having described my invention, I claim:

1. A draft attachment for plows and the like comprising a main beam, a trip beam movably seated in said main beam, a pair of spaced pivots carried by said main beam, positioning means fixed to said trip beam, said positioning means having a rearwardly opening slot extending longitudinally of said trip beam and seating one of said pivots and a forwardly opening slot normally seating said other pivot, said trip beam being swingable with longitudinal displacement relative to said main beam about said other pivot and on said longitudinal displacement about said one pivot, and yieldable means acting between said main and trip beams and cooperating with said pivots for normally holding said beams against relative movement.

2. A draft attachment for plows and the like comprising a main beam, a trip beam movably seated in said main beam, a pair of spaced pivots carried by said main beam, positioning means fixed to said trip beam, said positioning means having a rearwardly opening slot extending longitudinally of said trip beam and seating one of said pivots and a forwardly opening slot normally seating said other pivot, said trip beam being alternately swingable vertically about each of said pivots relative to said main beam, and a plurality of yieldable means each acting between said beams and cooperating with one of said pivots for normally holding said trip beam against swinging about the other pivot.

3. A draft attachment for plows and the like comprising a main beam, a trip beam movably seated in said main beam, a pair of spaced rollers carried by said main beam, positioning means fixed to said trip beam and having a rearwardly opening slot elongated longitudinally of said trip beam and receiving one of said rollers, said positioning means having a forwardly opening slot normally receiving the other roller, said trip beam being alternately swingable vertically relative to said main beam about each of said rollers, said other roller when received in said forwardly opening slot preventing swinging of said trip beam about said one roller, a segmental surface on a front end of said positioning means above said forwardly opening slot for rolling engagement with said other roller on displacement thereof from its slot, and yieldable means acting between said beams and cooperating with said rollers for normally holding said beams against relative movement.

4. A draft attachment for plows and the like comprising a main beam, a trip beam movably seated in said main beam, a pair of spaced pivots carried by said main beam, positioning means fixed to said trip beam and having a rearwardly opening slot extending longitudinally of said trip beam and seating one of said pivots, said positioning means having a forwardly opening slot normally seating said other pivot, said trip beam being swingable vertically relative to said main beam about said other pivot and on displacement thereof from said forwardly opening slot about said one pivot, and tension spring means connected to said main beam and acting forwardly and downwardly on said positioning means for normally holding said other pivot in said forwardly opening slot and on displacement thereof therefrom exerting a force assisting in swinging said trip beam upwardly about said other pivot.

5. A draft attachment for plows and the like comprising a main beam, a trip beam movably seated in said main beam, a front pivot mounted on said main beam, a rear pivot mounted for limited vertical movement on said main beam rearwardly of said front pivot and positioning means fixed to said trip beam, a rearwardly opening slot extending longitudinally of said trip beam and seating said rear pivot, said positioning means having a forwardly opening slot in said positioning means and normally seating said front pivot, said trip beam being swingable vertically relative to said main beam about said front pivot on vertical displacement of said rear pivot and about said rear pivot on displacement of said front pivot from said forwardly opening slot, and spring means acting downwardly on said rear pivot and forwardly on said positioning means for normally holding said beams against relative movement.

6. A draft attachment for plows and the like comprising a main beam, a trip beam carried by and displaceable longitudinally relative to said main beam and carrying a plowshare, means swingably connecting said beams for limited and extended upward movement of said plowshare relative to said main beam, respectively, without and on longitudinal displacement of said trip beam relative to said meain beam, and means yieldably resisting said relative limited upward movement of said plowshare and longitudinal displacement of said trip beam.

7. A draft attachment for plows and the like comprising a main beam, a trip beam carried by and displaceable longitudinally relative to said main beam and carrying a plowshare, means permitting limited upward displacement of said plowshare relative to said main beam without relative longitudinal displacement of said beams, means effective on said relative longitudinal displacement of said beams for permitting extended upward displacement of said plowshare relative to said main beam, and means acting between said beams and yieldably resisting said relative limited upward displacement of said plowshare and longitudinal displacement of said trip beam.

8. A draft attachment for plows and the like comprising a main beam, a trip beam carried by and displaceable longitudinally relative to said main beam and carrying a plowshare, means connecting said beams for alternate relative vertical swinging thereof about each of a plurality of spaced pivots at least one of which is disposed forwardly of said plowshare, means preventing said swinging of said trip beam about the other pivot except after relative longitudinal displacement of said beams, and yieldable means acting between said beams and yieldably restraining said trip beam against swinging about said one pivot and longitudinal displacement relative to said main beam.

9. A draft attachment for plows and the like comprising a main beam, a trip beam carried by said main beam and carrying a plowshare, a plurality of longitudinally spaced pivots carried by said main beam at least one of which is disposed forwardly of said plowshare, means rigid with said trip beam and normally engaging said pivots for enabling said trip beam alternately to swing about each thereof relative to said main beam, and means cooperating with said pivot and normally holding said trip beam against swinging about the other pivot.

10. A draft attachment for plows and the like comprising a main beam, a trip beam carried by said main beam and carrying a plowshare, a plurality of longitudinally spaced pivots carried by said main beam at least one of which is disposed forwardly of said plowshare, means rigid with said trip beam and normally engaging said pivots for enabling said trip beam alternately to swing about each thereof relative to said main beam, means yieldably resisting said swinging of said trip beam about said one pivot, and means cooperating with said one pivot and normally holding said trip beam against swinging about the other pivot.

11. A draft attachment for plows and the like comprising a main beam and carrying a plowshare, a trip beam carried by said main beam, a plurality of longitudinally spaced pivots carried by said main beam at least one of which is disposed forwardly of said plowshare, means rigid with said trip beam and normally engaging said pivots for enabling said trip beam alternately to swing about each thereof relative to said main beam, means yieldably resisting said swinging of said trip beam about said pivot, yieldable means cooperating with said one pivot and normally holding said trip beam against swinging about the other pivot, and means mounted on said main beam and operative on swinging of said trip beam about said other pivot for engaging and restoring said trip beam to normal position.

12. A draft attachment for plows and the like comprising a main beam and carrying a plowshare, a trip beam movably seated in said main beam, a pair of spaced pivots carried by said main beam at least one of which is disposed forwardly of said plowshare, means enabling said trip beam alternately to swing vertically relative to said main beam about each of said pivots, and a plurality of yieldable means each acting between said beams and cooperating with one of said pivots for normally holding said trip beam against swinging about the other pivot.

13. A draft attachment for plows and the like comprising a main beam, a trip beam carried by and displaceable longitudinally relative to said main beam, said trip beam carrying a plowshare, a plurality of spaced pivots carried by said main beam and disposed one forward and another rearward of the forward extremity of said plowshare in the normal relative positions of said main and trip beams, said trip beam normally being adapted for limited upward swinging relative to said main beam about said forward pivot and on rearward longitudinal displacement relative to said main beam being adapted for extended vertical swinging relative thereto about said rearward pivot, and means yieldably resisting movement of said trip beam relative to said main beam.

References Cited in the file of this patent

UNITED STATES PATENTS

| | | |
|---|---|---|
| 843,994 | Breen | Feb. 12, 1907 |
| 1,078,871 | Olson | Nov. 18, 1913 |
| 1,441,773 | Witter | Jan. 9, 1923 |
| 2,944,613 | Anderson | July 12, 1960 |

FOREIGN PATENTS

| | | |
|---|---|---|
| 253,298 | Great Britain | June 17, 1926 |
| 73,833 | Sweden | Aug. 17, 1928 |
| 161,484 | Sweden | Nov. 26, 1957 |
| 163,951 | Sweden | June 8, 1958 |